US012475491B1

(12) United States Patent
Raymond et al.

(10) Patent No.: US 12,475,491 B1
(45) Date of Patent: *Nov. 18, 2025

(54) METHOD, MEDIUM, AND SYSTEM FOR DEMAND PLANNING

(71) Applicant: JDA Software Group, Inc., Scottsdale, AZ (US)

(72) Inventors: Vincent Raymond, Montreal (CA); Eric Prescott-Gagnon, Montreal (CA); Marc Brisson, Boucherville (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/260,976

(22) Filed: Sep. 9, 2016

Related U.S. Application Data

(60) Provisional application No. 62/358,292, filed on Jul. 5, 2016, provisional application No. 62/240,736, filed on Oct. 13, 2015.

(51) Int. Cl.
*G06Q 30/00* (2023.01)
*G06Q 10/067* (2023.01)
*G06Q 30/0601* (2023.01)

(52) U.S. Cl.
CPC ....... *G06Q 30/0605* (2013.01); *G06Q 10/067* (2013.01)

(58) Field of Classification Search
CPC .......................... G06Q 30/0605; G06Q 10/067
USPC ....................................................... 705/26.2
See application file for complete search history.

(56) References Cited

U.S. PATENT DOCUMENTS

| | | | |
|---|---|---|---|
| 8,078,489 B1* | 12/2011 | Marsten | G06Q 10/04 705/7.25 |
| 8,301,486 B1* | 10/2012 | Marsten | G06Q 30/00 705/7.29 |
| 8,498,889 B1* | 7/2013 | Marsten | G06Q 30/0621 705/7.25 |
| 10,073,439 B1* | 9/2018 | Jacobs, II | G05B 19/4097 |

(Continued)

FOREIGN PATENT DOCUMENTS

| | | | | |
|---|---|---|---|---|
| JP | 2002073772 A | * | 3/2002 | A21D 13/60 |
| JP | 2005004599 A | * | 1/2005 | |

OTHER PUBLICATIONS

Ko, Jeonghan, and S. Jack Hu. "Balancing of manufacturing systems with complex configurations for delayed product differentiation." International journal of production research 46.15 (2008): 4285-4308. (Year: 2008).*

(Continued)

*Primary Examiner* — Matthew E Zimmerman
(74) *Attorney, Agent, or Firm* — Spencer Fane LLP; Steven J. Laureanti

(57) ABSTRACT

A system and method are disclosed including a demand planner that receives a demand for two or more options that are needed to produce at least one automobile. The demand planner also models the two or more options as a network of arcs and nodes and generates one or more valid configurations of the two or more options. The demand planner further determines the demand for the one or more valid configurations and causes at least one manufacturer to manufacture, the at least one automobile based on the determined demand for the one or more valid configurations.

20 Claims, 5 Drawing Sheets

(56) References Cited

U.S. PATENT DOCUMENTS

| | | | | |
|---|---|---|---|---|
| 2002/0040356 A1* | 4/2002 | Gluck | ................... | G06Q 50/06 |
| | | | | 705/412 |
| 2013/0173330 A1* | 7/2013 | Puskorius | .............. | G06Q 10/00 |
| | | | | 705/7.25 |
| 2021/0089002 A1* | 3/2021 | Jacobs | ............. | G06Q 10/06313 |

OTHER PUBLICATIONS

Pil & Holweg, "Linking Product Variety to Order-Fulfillment Strategies" Interfaces, vol. 34, No. 5, Sep.-Oct. 2004, pp. 394-403.

* cited by examiner

METHOD, MEDIUM, AND SYSTEM FOR DEMAND PLANNING

CROSS-REFERENCE TO RELATED APPLICATIONS

The present disclosure is related to that disclosed in U.S. Provisional Application No. 62/240,736, filed Oct. 13, 2015, entitled "System and Method for Demand Planning," and U.S. Provisional Application No. 62/358,292, filed Jul. 5, 2016, entitled "System and Method for Demand Planning." U.S. Provisional Application Nos. 62/240,736 and 62/358,292 are assigned to the assignee of the present application. The subject matter disclosed in U.S. Provisional Application Nos. 62/240,736 and 62/358,292 is hereby incorporated by reference into the present disclosure as if fully set forth herein. The present invention hereby claims priority under 35 U.S.C. § 119(e) to U.S. Provisional Application Nos. 62/240,736 and 62/358,292.

TECHNICAL FIELD

The disclosure relates generally to supply chain planning, and more specifically to a system and method for demand planning in a supply chain network.

BACKGROUND

Automobiles (such as cars, trucks, and other types of motorized vehicles) are typically sold in various configurations. Each configuration can have hundreds or thousands of different options. For example, a car may be sold in different trims, such as a sport model, economy model, premium model, or the like. Each of the models may have a different engine-type, a radio type, upholstery, lighting, or other like configuration of options. Some of the options may always be sold together in the same configuration while others may never be sold in the same configuration. The combination of so many configurations makes determining a production plan difficult. The complexity involved in having so many configuration of options to determine automobile production with so many possible configurations is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
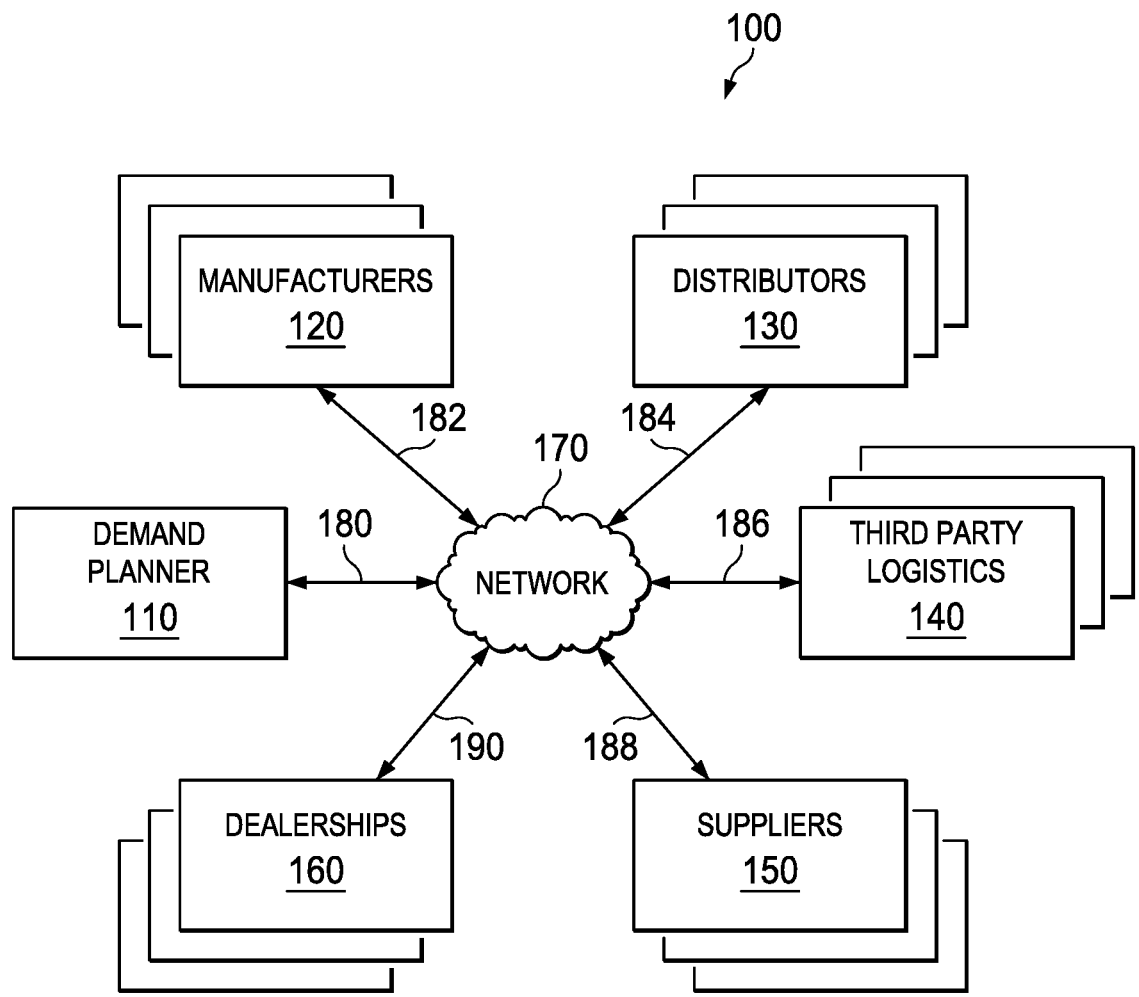
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to demand planning of a supply chain network 100, such as for example, an automobile supply chain network. Automobiles (such as cars, trucks, and other types of motorized vehicles) are typically sold with the presence or absence of various options or other components substituted for one another. The presence, absence, or substitution of any components may be termed as an "option." A typical automobile may comprise hundreds or thousands of options, which may be sold as various combinations of options, or option packages. For example, a car may be sold in various trim types, such as a sport model, economy model, mid-range model, premium model, or the like. Each of the models may be associated with a collection of options such as a specific engine-type (e.g. V8, V6, four cylinders), a radio type (e.g. AM/FM radio, satellite radio, touchscreen interface, navigation equipment), upholstery (e.g. fabric, leather, race-style seating), lighting (e.g. fog lamps, HID lights, LED lights, projector headlights), or other like options. As explained below in more detail, some of the options may be interdependent such that some options must always be included together, some options may never be included together, and some options may or may not be included in the same package.

In addition, selecting automobile option packages may be dependent on more than just the interdependency of options. Selecting such an option package may be dependent on demand, capacity and other manufacturing and logistical constraints, lead time, supply chain disruption, lot sizes, and other factors. Such factors play a crucial role in option package decisions such as adding or removing options from an option package or whether to introduce a new option package.

Demand planning for an automotive supply chain network 100 may entail modeling option packages as a hierarchy of options, and planning supply chain decisions based on modeled option packages. According to some embodiments, demand planning may comprise generating a supply chain plan based on the forecasted demand, the option hierarchy and model, and supply chain rules and constraints.

As an example only and not by way of limitation, an automobile manufacturer may receive demand data from an automotive dealership to produce more cars with a certain option, such as a diesel engine. The number of diesel engines may, however, be limited by capacity constraints. According to prior art attempts, the selection of automobile option packages was decided, by the capacity of production, but without keeping track of total demand. Instead, dealerships 160 would sell automobiles based almost entirely on capacity. Embodiments of the disclosed demand planner 110 provide for generating a delta between demand i.e., dealer demand and supply chain capacity, which provides for, among other things, the automobile supply chain network 100 to systematically adjust to forecasted demand.

FIG. 1 illustrates an exemplary supply chain network 100 according to a first embodiment. The supply chain network 100 comprises a demand planner 110, one or more manufacturers 120, one or more distributors 130, one or more third party logistics 140, one or more suppliers 150, one or more dealerships 160, a network 170, and communication links 180-190. Although a single demand planner 110, one or more manufacturers 120, one or more distributors 130, one or more third party logistics 140, one or more suppliers 150, one or more dealerships 160, and a single network 170, are shown and described; embodiments contemplate any number or combination of these, according to particular needs. For clarity, references in the disclosure to a singular or plural form of demand planner 110, manufacturer, distributor, third party logistics 140, suppliers 150, dealerships 160, network 170, and communication links 180-190 may refer to any number of such planners, entities, networks, or communication links, unless otherwise indicated.

The supply chain network 100 may operate on one or more computers that are integral to or separate from the hardware and/or software that support demand planner 110, manufacturers 120, distributors 130, third party logistics 140, suppliers 150, and dealerships 160. Demand planner 110, manufacturers 120, distributors 130, third party logistics 140, suppliers 150, and dealerships 160 may each comprise one or more computers that may perform one or more operations of the demand planner 110, as described herein, collectively or separately. Computers 240 (FIG. 2) may include any suitable input device 242, such as a keypad, mouse, touch screen, microphone, or other device to input information. An output device 244 may convey information associated with the operation of the supply chain network 100, including digital or analog data, visual information, or audio information. Computers may include fixed or removable computer-readable storage media 246, including a non-transitory computer-readable storage medium, magnetic computer disks, flash drives, CD-ROM, in-memory device or other suitable media to receive output from and provide input to the supply chain network 100. Computers 240 may include one or more processors and associated memory to execute instructions and manipulate information according to the operation of the supply chain network 100.

Demand planner 110, manufacturers 120, distributors 130, third party logistics 140, suppliers 150, and dealerships 160 may each operate on one or more separate computers 240, a network of one or more separate or collective computers 240, or may operate on one or more shared computers 240. Each of the one or more computers 240 may be a workstation, personal computer (PC), network computer, notebook computer, tablet, personal digital assistant (PDA), cell phone, telephone, smart phone, wireless data port, or any other suitable computing device. In an embodiment, one or more users may be associated with demand planner 110. These one or more users may include, for example, a "manager" or a "planner" handling demand planning and/or one or more related tasks within the supply chain network 100. In addition, or as an alternative, these one or more users within the supply chain network 100 may include, for example, one or more computers 240 programmed to autonomously handle, among other things, demand planning, option planning, production planning, slot sequence planning, order placement, and/or one or more related tasks within the supply chain network 100.

In one embodiment, manufacturers 120, distributors 130, third party logistics 140, suppliers 150, and dealerships 160 represent one or more automotive supply chain entities within supply chain network 100. A supplier 150 may include any suitable entity that offers to sell or otherwise provides one or more automotive components to one or more manufacturers 120. Such suppliers 150 may comprise automated distribution systems that automatically transport automobiles and automotive components to one or more manufacturers 120 based, at least in part, on an automobile production plan determined by the demand planner 110. Automotive components may comprise, for example, components, materials, products, parts, items, or supplies that may be used to produce automobiles or other automotive components. In addition, or as an alternative, an automotive component may comprise a part of the automobile or a supply or resource that is used to manufacture the automobile, but does not become a part of the automobile. In addition, or as an alternative, each of the one or more automotive components may be represented by an identifier, including, for example, Stock-Keeping Unit (SKU) or Universal Product Code (UPC) information.

A manufacturer 120 may be any suitable entity that manufactures at least one automobile or automotive component. A manufacturer 120 may use one or more automotive components during the manufacturing process to manufacture, fabricate, assemble, or otherwise process an automobile or automotive component. An automobile or automotive component may be supplied to another manufacturer 120, distributor 130, third party logistic 140, supplier 150, and/or dealership 160 in the automobile supply chain. A manufacturer 120 may, for example, produce and sell an automobile or automotive component to another manufacturer 120, a distributor 130, a supplier 150, dealership 160, a customer, or any other suitable person or entity. Such manufacturers 120 may comprise automated robotic production machinery that produces automobiles and automotive components based, at least in part, on an automobile production plan determined by the demand planner 110.

Third party logistics 140 may be any suitable entity that provides warehousing and transportation for automobile or automotive components in the automobile supply chain. Third party logistics 140, may, for example, receive an automobile or automotive component from another entity in the supply chain network 100 and store and transport the automobile or automotive component for another supply chain entity. Such third party logistics 140 may comprise automated warehousing systems that automatically remove automotive components from and place automotive components into inventory based, at least in part, on an automobile production plan determined by demand planner 110. Distributor 130 may be any suitable entity that offers to sell or otherwise distributes at least one automobile or automotive component to one or more dealerships 160 and/or customers. Such distributors 130 may comprise automated distribution systems that automatically transport automobiles and automotive components to one or more dealerships 160 or customers based, at least in part, on an automobile production plan determined by demand planner 110. Dealership 160 may be any suitable entity that obtains one or more automobiles or automotive component to sell to one or more customers. In addition, dealership 160 may sell, store, and supply one or more automotive components and/or repair an automobile with one or more automotive components.

Although one or more manufacturers 120, distributors 130, third party logistics 140, suppliers 150, and dealerships 160 are shown and described as separate and distinct entities, the same entity may simultaneously act as any one of the one or more manufacturers 120, distributors 130, third party logistics 140, suppliers 150, and dealerships 160. For example, one or more manufacturers 120 acting as a manufacturer 120 could produce an automobile or automotive component, and the same entity could act as a supplier 150 to supply an automobile or automotive component to another supply chain entity. Although one example of a supply chain network 100 is shown and described; embodiments contemplate any operational environment and/or supply chain network 100, without departing from the scope of the present disclosure.

In one embodiment, demand planner 110 generates one or more supply chain plans, including a demand plan, an option plan, a production plan, a slot sequence plan, and may modify one or more aspects of the supply chain based on the generated plans. For example, according to some embodiments, demand planner 110 places automobile or automotive components orders at one or more manufacturers 120, distributors 130, or suppliers 150, initiates manufacturing of the automobile or automotive components at one or more manufacturers 120, and determines automobile or automotive components to be carried at one or more dealerships 160. Furthermore, demand planner 110 adjusts mix ratios and inventory levels at various stocking points and distribution centers of manufacturers 120, distributors 130, third party logistics 140, suppliers 150, and dealerships 160.

In another embodiment, demand planner 110 is coupled with network 170 using communications link 180, which may be any wireline, wireless, or other link suitable to support data communications between demand planner 110 and network during operation of the supply chain network 100. Similarly, manufacturers 120, distributors 130, third party logistics 140, suppliers 150, and dealerships 160 are coupled with network 170 using communications links 182-190, which may be any wireline, wireless, or other links suitable to support data communications between manufacturers 120, distributors 130, third party logistics 140, suppliers 150, dealerships 160 and network 170 during operation of supply chain network 100.

Although the communication links 180-190 are shown as generally coupling the demand planner 110, manufacturers 120, distributors 130, third party logistics 140, suppliers 150, and dealerships 160 with network 170, demand planner 110, manufacturers 120, distributors 130, third party logistics 140, suppliers 150, and dealerships 160 may communicate directly with the demand planner 110, manufacturers 120, distributors 130, third party logistics 140, suppliers 150, and dealerships 160, according to particular needs.

In another embodiment, network 170 includes the Internet and any appropriate local area networks (LANs), metropolitan area networks (MANs), wide area networks (WANs) or computer networks coupling demand planner 110, manufacturers 120, distributors 130, third party logistics 140, suppliers 150, and dealerships 160. For example, data may be maintained by demand planner 110 at one or more locations external to the demand planner 110, manufacturers 120, distributors 130, third party logistics 140, suppliers 150, and dealerships 160 and made available to one or more associated users of demand planner 110, manufacturers 120, distributors 130, third party logistics 140, suppliers 150, and dealerships 160 using network 170 or in any other appropriate manner. Those skilled in the art will recognize that the complete structure and operation of supply chain network 100 and other components within the supply chain network 100 are not depicted or described. Embodiments may be employed in conjunction with known communications networks and other components.

Figure 2:
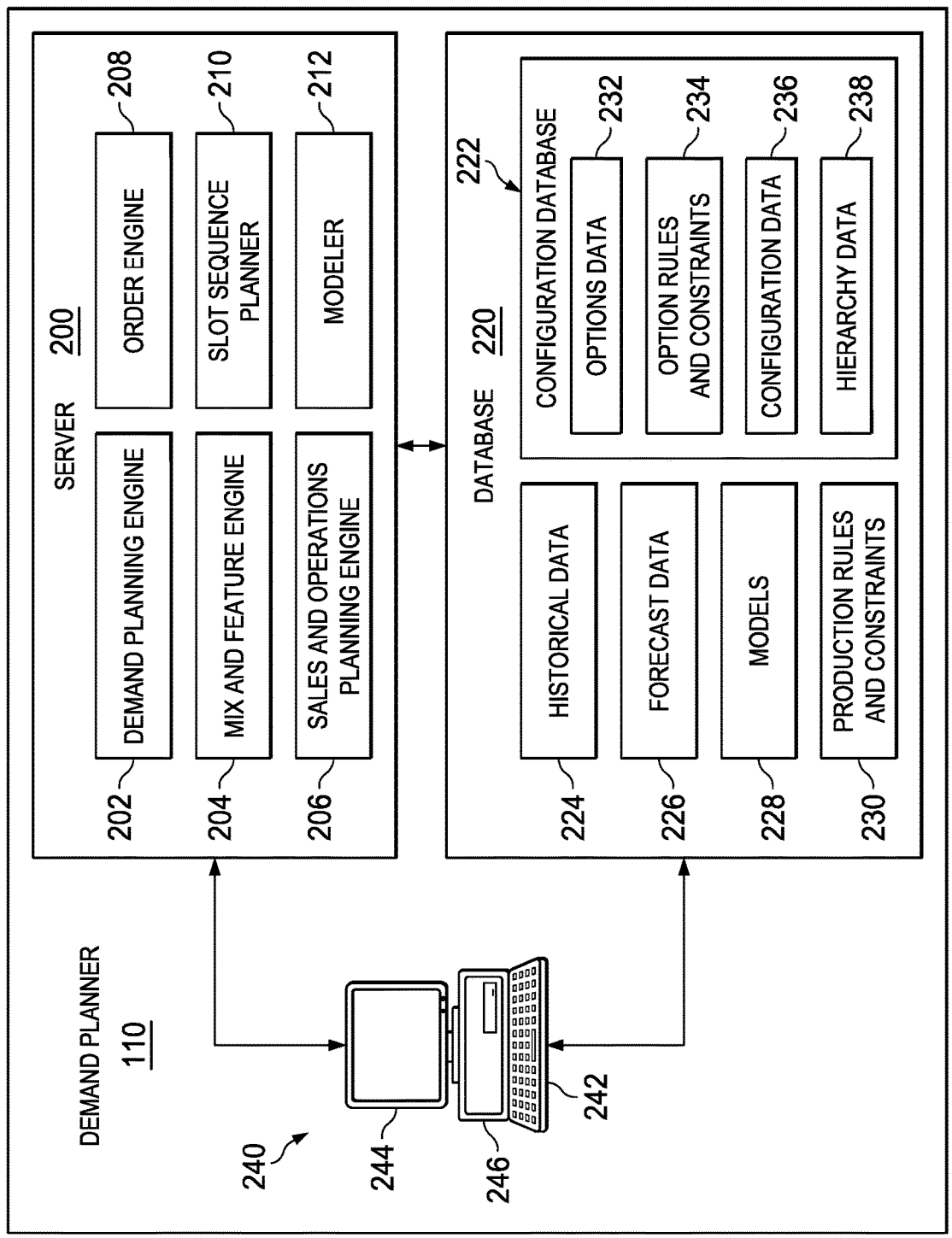
FIG. 2 illustrates the demand planner of FIG. 1 in greater detail, in accordance with the first embodiment.

FIG. 2 illustrates demand planner 110 of FIG. 1 in greater detail, in accordance with the first embodiment. As discussed above, demand planner 110 may comprise one or more computers 240 at one or more locations including associated input devices 242, output devices 244, non-transitory computer-readable storage media 246, processors, memory, or other components for receiving, processing, storing, and communicating information according to the operation of the supply chain network 100. In addition, and as discussed in more detail below, demand planner 110 may comprise one or more servers 200, databases 220 and/or computers 240. Although demand planner 110 is shown and described as comprising a single server 200 database 220, and computer 240; embodiments contemplate any suitable number of servers 200, databases 220, or computers 240 internal to or externally coupled with demand planner 110. In addition, or as an alternative, demand planner 110 may be located internal or external to manufacturers 120, distributors 130, third party logistics 140, suppliers 150, and dealerships 160, according to particular needs.

According to some embodiments, server 200 of demand planner 110 comprises demand planning engine 202, mix and feature engine 204, sales and operations planning engine 206, order engine 208, slot sequence planner 210, and modeler 212. According to other embodiments, database 220 of demand planner 110 comprises configuration database 222, historical data 224, forecast data 226, models 228, and production rules and constraints 230. Configuration database 222 of database 220 may comprise data related to automobile options, option packages, configurations, and relations among them, such as options data 232, options rules and constraints 234, configuration data 236, and hierarchy data 238.

Although particular engines, planners, modelers, and databases are shown and described; embodiments contemplate any suitable number or combination of engines, planners, modelers, and databases located at one or more locations, local to, or remote from, demand planner 110, according to particular needs. Furthermore, the engines, planners, modelers, and databases may be located at one or more locations, local to or remote from, demand planner 110 such as on multiple servers or computers at any location in the supply chain network 100, such as networked among various manufacturers 120, distributors 130, third party logistics 140, suppliers 150, and dealerships 160.

Demand planning engine 202 of server 200 may receive historical data 224, such as, for example, demand data, and generate a demand plan. The demand plan may comprise the percentage of demand and/or quantities of demand associated with an option or option package of automobiles. For example, demand planning engine 202 may receive historical data 224 and forecast data 226 (including, for example, marketplace data and demand data) from dealerships 160. Historical data 224 and forecast data 226 may include demand categorized by options, option packages, components, automobiles, or the like. In response to receiving historical data 224 and forecast data 226, demand planning engine 202 may generate a demand plan based, at least in part, on the received data.

Mix and feature engine 204 of server 200 may generate an option plan by associating constraints with options of the automobile option package. For example, mix and feature engine 204 may categorize and organize options according to option rules and constraints 234. Option rules and constraints 234 may require that certain options are always found in an automobile together, are never found in an automobile together, are dependent or independent of other options, or must be found in specific ratios in the automobile, and other like rules and constraints. Mix and feature engine 204 may use the options rules and constraints 234 to refine the demand plan of demand planning engine 202, such that, the demand for options is compatible with supply chain constraints.

Sales and operations planning engine 206 of server 200 may generate a production plan based on production rules and constraints 230. According to embodiments, sales and operations planning engine 206 receives production rules and constraints 230 such as, for example, constraints covering production limits set on select options and/or features as well as constraint rules which govern engineering compatibility of relations between the options and/or features. For example, production limits may be maximum supply available per a defined time horizon that is available to meet a particular demand volume. As another example, constraint rules around options and/or features may be if option A is selected, then option B must also be selected or option B cannot be selected when option A is selected or if option A and option B are selected, then either of option C or option D must be selected. Embodiments contemplate that the production rules are a combination of logical operators. In addition, or as an alternative, sales and operations planning engine 206 generates a production plan based at least in part on production rules and constraints 230.

Demand planner 110 may then reconcile the option plan from mix and feature engine 204 according to the demand plan and the production plan, iteratively, to generate an order plan. In other words, demand planner 110 may receive the demand plan, option plan, and production plan and refine each of the plans iteratively in order to generate a plan that satisfies demand, options rules and constraints 234, and production rules and constraints 230. According to some embodiments, a master plan is generated by a planner, then, demand planner 110 generates a supply chain plan comprising an unconstrained demand plan and an option and/or feature plan. In one embodiment, the planner may take an unconstrained demand & option plan (coming from the demand planner 110) as an input into sales and an operations plan and constrain the plan based on production limits and option and/or feature compatibility. In addition, or as an alternative, the output of the production plan may be a constrained demand and option and/or feature plan which may not equal the unconstrained plan. In addition, the production plan may be visible and applicable to all parts of the supply chain network 100.

After the demand plan, option plan, and production plan are generated, order engine 208 of the demand planner 110 may communicate with the supply chain entities i.e., manufacturers 120, distributors 130, third party logistics 140, suppliers 150, and dealerships 160 to produce automobiles or automotive components according to the refined demand, option, and production plans. As an example only and not by way of limitation, order engine 208 may place orders with manufacturers 120, suppliers 150, third party logistics 140, and distributors 130 to produce or ship automobile and automotive components according to the options in the plan and may communicate to dealerships 160 the quantity and options of automobiles and automotive components that will be produced and the date that the automobiles and automotive components will arrive at the dealerships 160.

Slot sequence planner 210 of server 200 may generate a slot sequence for the production of the automobiles or automotive components that will be produced according to the order of order engine 208. For example, slot sequence planner 210 may generate a plan that determines which automobiles or automotive components will be produced during a specific time frame or planning horizon, and the order or priority of the automobiles or automotive components produced.

Returning to database 220 of demand planner 110, historical data 224 of database 220 may comprise past sales data, marketplace data, demand data, or the like data. Such data may be received from the dealership sales data or other data from the supply chain entities. Forecast data 226 of database 220 may comprise data generated by demand planning engine 202 or other forecasted demand, such as dealership demand data. Forecast data 226 may comprise data received by dealerships 160 about expected consumer demand and may be based, at least in part, on projections from historical data 224. Models 228 of database 220 may comprise any suitable model of options. According to some embodiments, models 228 comprise a network model comprising nodes and arcs where nodes represent options and arcs represent a configuration, as described in more detail below. Production rules and constraints 230 of database 220 are related to the capability of manufacturing to produce automobiles and may comprise assembly constraints and production constraints such as, for example, production volume.

Returning to configuration database 222 of database 220, options data 232 may comprise data identifying available options associated with the make and models of automobiles. Each option may be associated with a particular automobile or one or more options may be associated with one or more automobiles, according to particular needs. Options may comprise selectable or configurable features, components, or configurations of automobiles. For example, options may comprise selection of an engine, transmission, wheels, color, seats, head lamps, quality of materials (such as interior or exterior finish options), brakes, tires, intake, exhaust, or other components or systems of an automobile. Options may comprise the absence or presence of any automotive component or may represent a particular configuration of the presence or absence of any automotive component. Options may comprise a particular version or part number of a selected automotive component, which may vary based on geographical location, safety requirements, ruggedness, premium or economy model, or like requirements.

One or more of the options may have relationships that define various combinations and permutations of options in a finished automobile and automotive component. These relationships may be defined by options rules and constraints 234 of configuration database 222. Options rules and constraints 234 comprise limits and permissions for relationships between options, such as limits to which options may occur together in a configuration and which options may not occur together in a package. For example, an options rule and constraint 234 may be that "premium leather seating is only available with V-8 engine." Therefore, as described below in more detail, any option for premium leather seating would be allowed only if the option for V-8 engine also occurred in the same configuration. Embodiments contemplate any suitable options rules and constraints 234, according to particular needs.

Additionally, options rules and constraints 234 may be assigned to options according to a hierarchy stored in hierarchy data 238. Hierarchy data 238 may comprise a priority associated with each option such that options with a higher priority are assigned to an automobile prior to an option with a lower priority.

Each combination or permutation of options may be termed an option package, or a configuration. Each collection of options may be termed a configuration or option package. A configuration may comprise any collection of one or more options. An option package may comprise a collection of options sold as a group or offered for sale to a consumer as a group. Each automobile in configuration database 222 may be associated with permitted configurations and option packages, which may be stored in the configuration data 236 of the configuration database 238.

Figure 3:
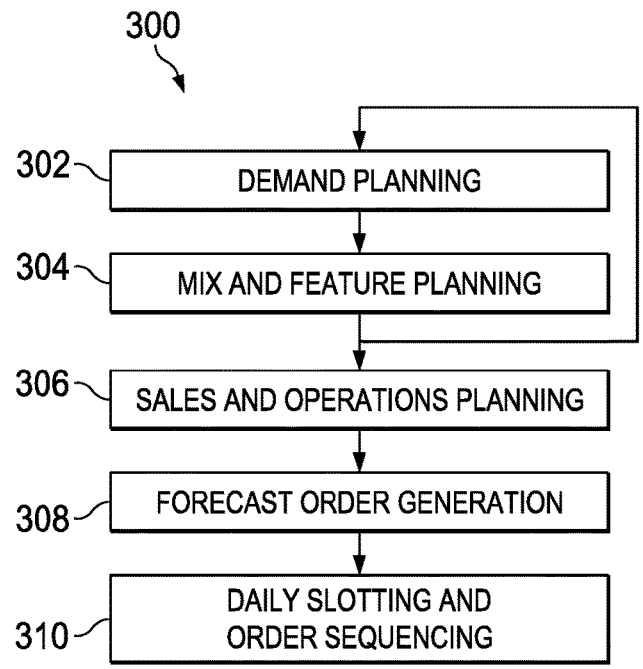
FIG. 3 illustrates an exemplary method of demand planning according to an embodiment.

FIG. 3 illustrates an exemplary method 300 of global demand planning according to an embodiment. Although global demand planning is depicted as a linear process, one or more actions may be performed in any order, combination, or repetitions to perform global demand planning. For example, demand planning 302, mix and feature planning 304, and sales and operations planning 306 may comprise iterative processes that are performed multiple times in various orders, such that the demand plan, the option plan, and production plan inform and refine each other according to production rules and constraints 230, historical data 224, models 228, forecast data 226, options rules and constraints 232, options data 232, package data, and hierarchy data 238.

At action 302, demand planning engine 202 generates a demand plan from a global consolidated view of market demand and production requirements. Demand planning engine 202 may receive historical data 224, forecast data 226, production rules and constraints 230, and the like and generate a demand plan, which may include projected demand for one or more automobiles and automotive components. A demand plan may include a preliminary assessment of data received from dealerships 160, such as, for example, demand for types and quantities of automobiles and automotive components. Demand planner 110 may communicate the generated demand plan to mix and feature engine 204 and sales and operations planning engine 206.

At action 304, mix and feature engine 204 may determine the take rates and volumes of automobiles and automotive components at the option level. The mix and feature engine 204 may refine the demand plan according to the mix or the interaction between available automobile options. After action 304, demand planner 110 may return to action 302 and iteratively refine the demand plan according to the option plan, such as analyzing the available options and returning to the demand plan to alter take rate percentages. In addition, or in the alternative, demand planner 110 may continue to action 306.

At action 306, sales and operations planning engine 206 may generate a production plan optimized to fulfill market demand and generate forecast orders. For example, sales and operations planning engine 206 may refine the option plan according to production capacity, incrementally, so that, for example, a production plan is substantially refined according to the demand plan.

At action 308, order engine 208 communicates with supply chain entities, such as, for example, manufacturers 120, distributors 130, third party logistics 140, suppliers 150, and dealerships 160 to carry out a production plan, by placing orders and/or communicating production data. As an example only and not by way of limitation, automated robotic production machinery at manufacturers 120 may produce automobiles and automotive components based, at least in part, on the production plan. In addition, or as an alternative, automated distribution and warehousing systems at distributors 130, third party logistics 140, and suppliers 150 may automatically transport or place or remove items from inventory based, at least in part, on the production plan.

At action 310, slot sequence planner 210 generates an order or priority of production of automobiles and automotive components. For example, slot sequence planner 210 may generate a sequence plan that determines which automobiles and automotive components will be produced during a specific time frame or planning horizon, and the order or priority of the automobiles and automotive components produced. For example, automated robotic production machinery at manufacturers 120 may produce automobiles and automotive components based, at least in part, on a sequence plan determined by the slot sequence planner.

Figure 4:
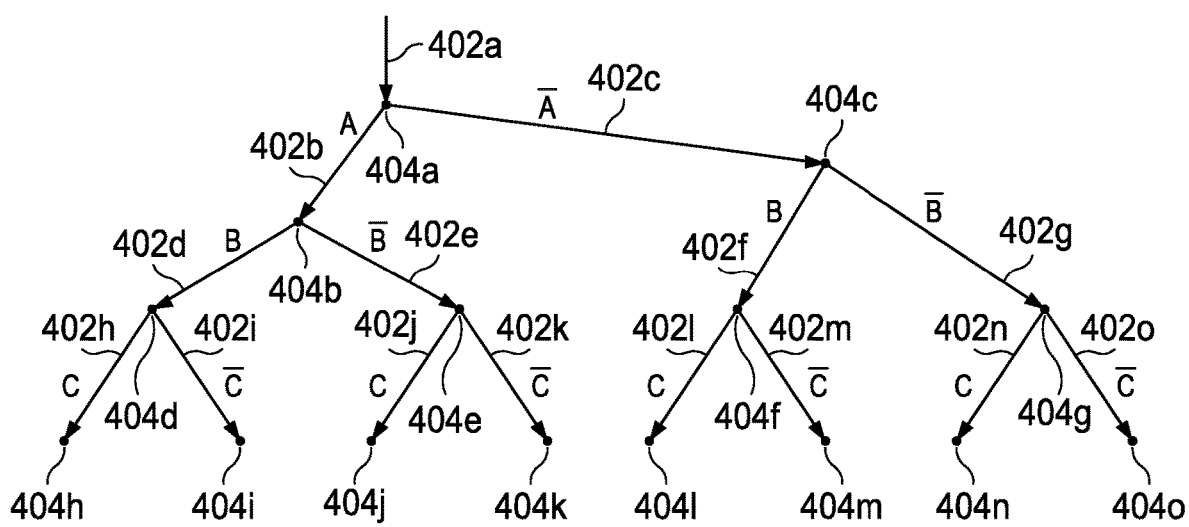
FIG. 4 illustrates a network model of options and option relationships generated by the modeler of the demand planner.

FIG. 4 illustrates a network model 400 of options and option relationships generated by modeler 212 of demand planner 110. The network model 400 may comprise a set of automobile or automotive component options modeled according to relationships between options of options rules and constraints 234, and configured into a set, combination, or permutation of valid configurations or option packages. For example, an automobile may comprise exemplary options A-N comprising three trim options A-C, two powertrain options D-E, two country options F-G, three body options H-J, and any number of further options L-M. For a typical automobile, the number of options may range from a small amount of options on, for example, a basic model, to many thousands of options on other models.

One or more of the options may have relationships that define various combinations and permutations of options in a finished automobile and automotive component. Each combination or permutation of options may be termed an option package, or configuration. The combinations and permutations of options may be determined by constraints and rules that determine which options can be present in combination or permutation with other options in a finished automobile and automotive component. In an embodiment, some constraints and rules may be illustrated by arcs 402 that connects one valid option to another valid option by nodes 404. For example, in an exemplary configuration, a trim option B may only be compatible with a powertrain option D and trim option C may only be compatible with a powertrain option E, but trim option A may have either powertrain option D or powertrain option E. Any suitable relationships between options are possible according to particular rules and constraints.

In this manner, as the connections between options grow, the number of configurations grows to an exponential number, and the modeled network 400 grows exponentially. For a typical automobile demand planning problem, the large number of options and configurations are difficult to plan.

For example, assume an automobile configuration with three options: A, B, and C and 100 automobiles comprise options A and C, but not option B.

The solutions of possible configuration may be more complex than a single configuration. For example, 50 automobiles may have option A and not have option A, 25 automobiles may have option B, and 75 automobiles may not have option B, and 20 automobiles may have option C, and 80 automobiles may not have option C. This planning problem for a simple example demonstrates that the possible combinations of options may be difficult to calculate for even a three options problem. However, typical automobiles may have hundreds or even thousands of options. Combined with production rules and constraints 230, such a planning problem would not be able to be straightforwardly solved by a computer 240.

For example, a dealership 160 may have difficulty planning the type or types of automobiles to carry for the next season, the next year, or some future time period based on the extremely large number of configurations that must be considered. Even though a dealership 160 may attempt to forecast take rates for a particular option, such as for a specific engine, the dealership 160 may not have enough information to generate option packages for production, even though they may have some take rate requirements for some options. As a simplistic example, and not by way of limitation, a dealership 160 may forecast, for example, 20% of automobiles have a V8 engine, 60% may have a V6, and 20% have a four-cylinders, but even with specific option forecasts, the forecast percentages will not reflect production rules and constraints 230 or option rules and constraints 234.

In order to plan automobile and automotive options, modeler 212 of demand planner 110 may generate models 228, such as a network model 400, of automobile options according to one or more models 228 stored in the database 220. In the following example, the modeler 212 represents one or more options of an automobile in terms of a network of arcs 402 and nodes 404. That is, each connecting arc 402 represents a valid configuration, and each option is represented as a node 404. Although, a simplified exemplary network model 400 is illustrated; embodiments contemplate any number of options, configurations, arcs 402, and nodes 404, according to particular needs.

In one embodiment, for each configuration of options, there are many rules that create compatibility and incompatibility among options. For example, some engines may not be compatible with some transmissions or may require other options to handle the increased power or larger size of the engine. A large engine may require, for example, a more robust transmission, larger brakes, or different internal parts to handle the increased power requirements of the engine (such as a more efficient air intake, larger fuel injectors, or the like). The large engine may be incompatible with the manual transmission offered by the automobile manufacturer, the combination of which would represent an invalid configuration. Therefore, when a manufacturer 120 plans to produce 20% of automobiles with a diesel engine, other options may necessarily need to be produced in volumes sufficient to support the 20% target.

This illustrates that, among other things, based on the large set of combinations, it is impossible to determine the accurate percentages to produce of each option solely from demand for each option based on the compatibility and incompatibility option rules and constraints 234. In addition, each of the one or more options may be restrained by a limited supplier 150 capacity or other production rules and constraints 230 (such as minimum order size, lot size, and the like). For example, an option may be desired in 90% of automobiles, but supply capacity limits the option to only 30% of automobiles. By way of another example only and not by way of limitation, demand for sunroofs for an automobile may have a total demand of 10 million in a year. However, the total produced by suppliers 150 or manufacturers 120 may only be 500,000 in a year. Therefore, the demand planner 110 relates production rules and constraints 230 to the model 228.

As a further example and not by way of limitation, a particular automobile may be limited by the amount of manufacturing capacity that a manufacturer 120 may produce of the automobile or an automotive component. Based on this, even if the market demand is high enough to support increased sales, capacity restrictions prevent the full demand from being met. Therefore, automobile demand planning requires tradeoffs between what configurations that can be produced and what configurations would meet demand. This type of demand planning is impossible manually or by human calculation, for at least that reason that the possible combination of options and the different supply chain arcs and number of markets (for example, the European, American, Latin America, and Asian markets) are impossibly large.

However, according to the present disclosure, embodiments provide for take rates of each configuration or option package that may be communicated to the supply chain entities to plan and create the automobile or automotive component according to the amount necessary to meet the refined demand, option, and production plans. In addition, or as an alternative, an amount may include accounting of spare parts. An automobile, for example, may need many parts (engine, transmission, wheels, frame, etc.) to be manufactured in the proper quantity, shipped between the appropriate entities, assembled according to the final configuration or option package, and delivered to a dealership 160 in an amount according to a plan.

According to some embodiments, feedback may occur between the plans, which permits demand planner 110 to switch and adjust options to reconcile the one or more plans in order to most closely match a production plan with a demand plan.

TABLE 1

| Time Period | Model | Market | Options | Mix Rate |
|---|---|---|---|---|
| June 2015 | Automobile Sport | Canada | 835 units · 835 units | |
| | | | Diesel Engine | 20% · 20% |
| | | | Automatic Transmission | 40% · 30% |
| | | | Satellite Radio | 30% · 32% |
| June 2015 | Automobile Premium | Canada | 450 units · 200 units | |
| | | | Diesel Engine | 30% · 20% |
| | | | Automatic Transmission | 10% · 20% |
| | | | Satellite Radio | 40% · 34% |

TABLE 1 illustrates an exemplary automobile configuration according to an embodiment. As illustrated, the configuration of TABLE 1 illustrates selected options and take rates for two automobile configurations for an automobile (Sport and Premium) in June 2015, in the Canadian market. Although only two automobile configurations are shown and described; embodiments contemplate any suitable number of automobile models and options, according to particular needs.

As illustrated in TABLE 1, the automobile has two trim options, Sport (planned to be 835 units) and Premium (planned to be 450 units). For simplicity, each trim option is only shown comprising three related options: engine, transmission, and radio. Although one trim option, one engine option, one transmission option, and one radio option are illustrated, embodiments contemplate any suitable number or combination of options. The configuration of the Sport and the Premium both comprise diesel engines, automatic transmissions, and satellite radio. Alternative configurations may comprise a four-stroke engine, a manual transmission, and an AM/FM radio. According to an embodiment, the demand planner 110 first determines percentages of option configurations based on demand and based on option planning.

Next, demand planner 110 may consider production constraints on the production of the automobile during June 2015. Production constraints may only allow for a total of 3,500 automobiles. This may mean that, even if demand for the two trim options exceeds 3,500 automobiles, one or both trims will not be able to be produced to meet the forecasted take rates. Other constraints may limit particular parts used in one or more configurations. For example, under the category heading "Mix Rate," the first number may comprise a demand take rate, and the second number may comprise a production take rate. As illustrated for example, because all diesel engines in the example are restricted to also having automatic transmissions, some of the demand take rates are less and more than the corresponding production take rates because options rules and constraints 234 and production rules and constraints 230 limit the number of automobiles that may have diesel engines and automatic transmissions.

The demand planner 110 may determine the demand take rate based on, for example, past sales, the market of one or more countries, the people, the dealer, the manufacturer 120, and/or the like. The demand planner 110 may also determine the production take rate based on production rules and constraints 230. According to some embodiments, the demand take rate comprises a target generated by the demand planning engine and the production take rate comprises an operational target generated by the sales and operations planning engine 206.

To further illustrate the operation of demand planning, an example is now given. In the following example, a demand take rate for the automobile may be based, mostly or in part, on information received from automobile dealerships 160, such as forecasts of consumer demand for one or more options or configurations. The dealerships 160 may forecast trends for an upcoming season and communicate the demand to the demand planner 110. According to the demand, the demand planner 110 may use a network model 400 to generate an optimum demand plan that corresponds to configurations that fulfill the forecasted demand. When determining the optimum demand plan, the optimized plan may not consider the requirements of automobile production, such as, for example, multiple automobiles being assembled in a single plant, the time necessary to increase production of limited parts, or other production constraints. Once the optimum demand plan is generated, the demand planner 110 may incorporate production rules and constraints 230, such as capacity or the sharing of resources. For example, as illustrated in the example depicted in TABLE 1, the number of automobiles may be limited to 3500 in June 2015, which may be based on the two trim options sharing the same assembly facility, while the total number of transmissions may be limited to 1500, which may represent a supply chain shortage. In this manner, the demand planner 110 may solve an automobile demand planning problem by solving all configurations of one or more automobiles and automotive components with shared resources.

According to embodiments, the demand planning may be repeated for each planning horizon based on the granularity of demand, ordering horizon, assembly period, or other time constraints. According to some embodiments, order engine 208 and slot sequence planner 210 generate orders based on the planning horizon. For example, the mix rates generated for June 2015 may be calculated in any previous time period, such that the automobiles and automotive components may arrive in dealerships 160 on or before June 2015.

Continuing with the network model 400 of FIG. 4 of options and option relationships generated by modeler 212 of demand planner 110, an initial arc 402a represents the input to the model 400. Each arc 402 associated with a letter, A, B, and C represents an option. Each arc 402 associated with a letter with a bar above it represents not having that option. For example, arc 402b denoted A represents a configuration with option A, and arc 402c denoted $\bar{A}$ represents a configuration without option A. According to the example illustrated in FIG. 4, the option relationship has one restriction: each configuration must have exactly one of option B or option C. Each arc 402 from the top of the network model 400 following along arcs 402 to the bottom of the network model 400 represents a particular configuration. For example, starting at the left side at node 404a and choosing arc 402b denoted A represents an automobile or automotive component with option A. Starting on the right side and choosing arc 402c denoted $\bar{A}$ represents an automobile or automotive component without option A.

Next, one of the arcs 402d-402e may be chosen between B and $\bar{B}$ at node 404b. An arc 402d along the line denoted B represents an automobile and automotive component with options A and B, and an arc 402e along $\bar{B}$ represents a configuration of an automobile and automotive component with option A and without option B. Additionally, one of the arcs 402f-402g may be chosen between B and $\bar{B}$ at node 404c. An arc 402f along the line denoted B represents an automobile and automotive component without option A and with option B, and an arc 402g along $\bar{B}$ represents a configuration of an automobile and automotive component without both options A and B. A similar decision is made for option C at nodes 404d-404g.

According to an embodiment, the modeler 212 of the demand planner 110 may receive one or more option rules and constraints 234 and prune invalid configurations from the network model 400. Therefore, the modeler prunes each arc 402 and node 404 that is not a valid configuration.

Figure 5:
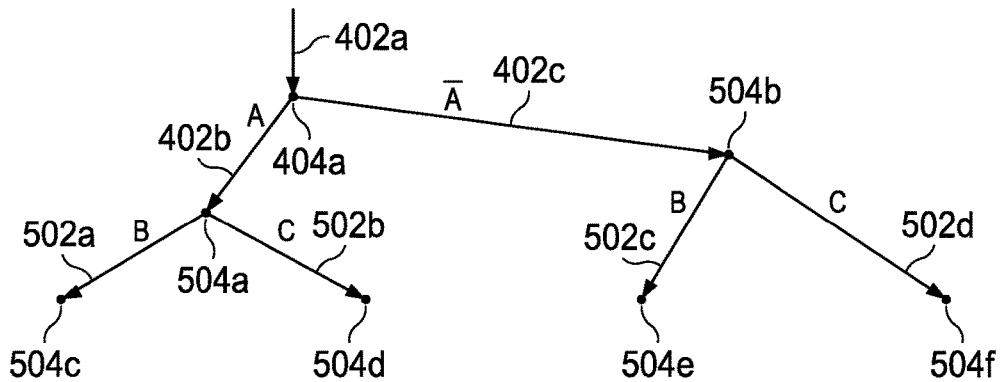
FIG. 5 illustrates the pruned network model of FIG. 6 according to an embodiment.

FIG. 5 illustrates a pruned network model 500, according to an embodiment after pruning. According to an embodiment, modeler 212 may rearrange or reorganize the network model 400 after pruning to eliminate redundant arcs 402 and nodes 404. For example, the pruned network model 500 of FIG. 5 may comprise a reorganized view of the network model 400 of FIG. 4. As mentioned above, the exemplary network model 400 of FIG. 4 comprises the constraint that each valid configuration must have only one B or one C. After receiving the option rule or constraint 234, modeler 212 may eliminate any configuration that has both B and C, because this would violate the option constraint. Additionally, any configuration that has both $\bar{B}$ and $\bar{C}$ together is eliminated because the valid configurations are constrained to have at least one of option B and option C. Modeler 212 may remove each invalid configuration and reorganize the network model.

As illustrated, modeler 212 has replaced the arcs 402d-402g having both B and C, B and $\bar{C}$, and $\bar{B}$ and C with only arcs 502a-502d representing B or C. For example, based on the constraint that each valid configuration must have only one of B or C, the arcs 402d, 402i, 402f, and 402m represented by B and $\bar{C}$ represents the same configuration as arcs 502*a* and 502*c* representing B alone. Modeler 212 may make other logical substitutions, according to other option rules and constraints 234 to generate a model where each arc 402, 502 represents a valid configuration. In one embodiment, each time an arc 402 is added to the network model, the new path is validated according to the constraints, then, if it is not valid, the arc 402 is removed.

By way of example only and not by way of limitation, a network model 400 of an automobile and automotive component with 130 options may have as many as $2.66 \times 10^{36}$ nodes 404. By incorporating logical substitutions according to option rules and constraints 234, modeler 212 may generate a pruned network model 500 where every valid configuration is represented by as few as 35,000 nodes 504. In this manner, the option planning described in this disclosure, among other things, speeds up the operation of a computer.

After generating a pruned network model 500, modeler 212 may generate a linear programming optimization model by associating a vector of binary values with pruned network model 500 and generating equations representing flow conservation in the pruned network model 500 and demand take rate constraints comprising slack and surplus variables.

Modeler 212 may associate a vector of binary values with one or more nodes 404, 504 of the pruned network model 500. According to an embodiment, each node 404, 504 may be represented by a vector of binary values, where each option comprises a column, and each value represents a configuration for that option, such as 1 representing that an option appears in the configuration, and a 0 representing that an option does not appear in the configuration. For example, the vector associated with node 504*a* may comprise {A, B, C}={1, ?, ?}, where 1 represents that the option A appears in the configuration, and ? represents that the configuration of options B and C are unknown at node A. At node 504*c*, the vector {A, B, C}={1, 1, 0} may represent the known configuration at that node 504*c*, i.e. options A and B appear in the configuration, but option C does not. Similar vectors may be associated with one or more additional nodes 404, 504 by modeler 212. Although a single vector comprising values of 1 and 0 are illustrated; embodiments contemplate any vector, array, or values to represent particular configurations according to particular needs.

Additionally or in the alternative, modeler 212 generating equations representing flow conservation in the pruned network model 500 and demand take rate constraints comprising slack and surplus variables. Modeler 212 may represent flow conservation in the pruned network model 500 by associating decision variables with one or more arcs 402, 502.

Figure 6:
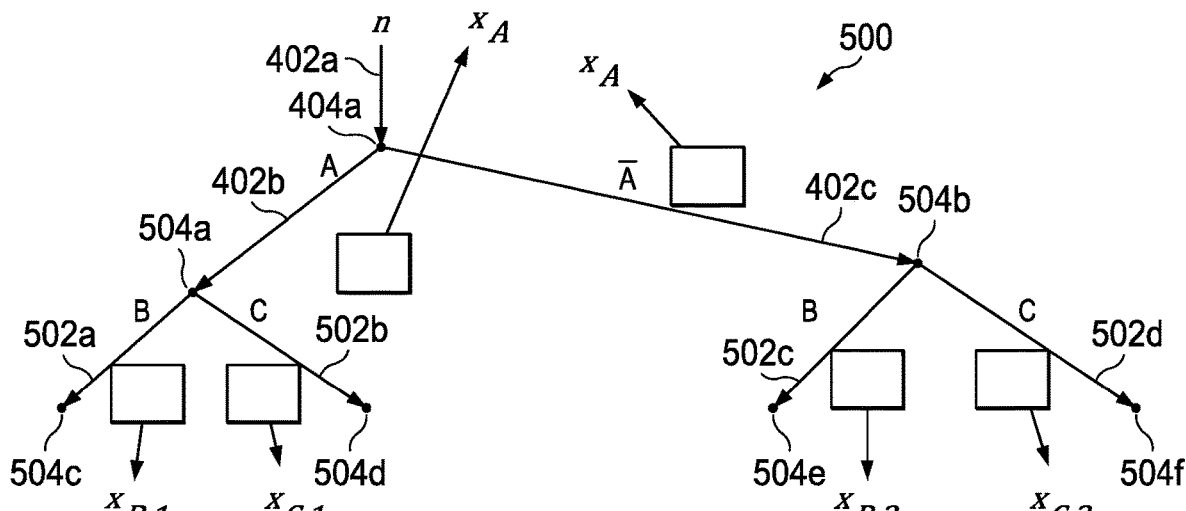
FIG. 6 illustrates the network model of FIG. 6 after pruning according to an embodiment.

FIG. 6 illustrates a pruned network model 500 with exemplary decision variables associated with arcs 402, 502, according to an embodiment. According to one embodiment, modeler 212 associates a decision variable with each arc 402, 502 of a valid configuration. Each decision variable may represent a real and/or integer number of a percentage or amount of configurations associated with that arc 402, 502. For example, modeler 212 may associate arc 402*a* with decision variable n, which may represent any amount or take rate of automobiles and automotive components at arc 402*a*. Additionally, modeler 212 may associate other decision variables ($x_A$, $x_{\overline{A}}$, $x_{B,1}$, $x_{C,1}$, $x_{B,2}$, and $x_{C,2}$) with arcs 402*b*, 402*c*, 502*a*, 502*b*, 502*c*, and 502*d*, respectively. Each decision variable may take any value between 0 and n. Although particular examples of decision variables; embodiments contemplate any suitable decision variables for any number or combination of arcs 402, 502, according to particular needs.

After assigning decision variables to arcs 402, 502, modeler 212 may build relationships between various option configurations to conserve flow in the network. At each node 404, 504, flow must be conserved, such that the flow leaving each node 404, 504 is equal to the flow arriving at each node 404, 504.

For example, because all of the automobiles and automotive components in the network model 400 must pass the first node 404*a*, the total of $x_A$ and $x_{\overline{A}}$ must equal n, or the flow associated with arc 402*a*. Therefore, in a network model representing a take rate, n would equal 100%.

Continuing with the above example, modeler 212 builds further relationships between various option configurations to conserve flow in the network model 400. For example, if the flow of arc 402*b* associated with decision variable XA would equal 60%, then the flow of arc 402*c* associated with decision variable xx would equal 40%, to conserve the flow of 100% from the first node 404*a*. This may be represented by the equation: $x_A + x_{\overline{A}} = n$.

Modeler 212 continues to generate equations based on the conservation of flow at further nodes in the network model 400. For example, the flow at node 504*a* representing a choice between options B and C must equal the flow arriving at the node 504*a* from arc 402*b* associated with decision variable $x_A$. Therefore, the sum of decision variables $x_{B,1}$ and $x_{C,1}$ associated with arcs 502*a* and 502*b* must be equal to $x_A$. Accordingly, if $x_A$ equals 60%, then the sum of $x_{B,1}$ and $x_{C,1}$ must also be equal to 60%. This may be represented by the equation: $x_{B,1} + x_{C,1} = x_A$. In a similar manner, the sum of $x_{B,2}$ and $x_{C,2}$ must be equal to $x_{\overline{A}}$. Therefore, if $x_{\overline{A}}$ would equal 40%, then the sum of $x_{B,2}$ and $x_{C,2}$ must also be equal to 40%. According to embodiments, modeler 212 may continue to determine flow conservation along any additional arcs 402, 502 to develop further relationships between decision variables until each arc 402, 502 has been followed to a final arc 402, 502 or node 404, 504.

Although particular examples of take rates are shown and described; embodiments contemplate any suitable take rates or amounts of flow for any number or combination of nodes and arcs 602, according to particular needs.

After associating decision variables with one or more arcs 402, 502, modeler 212 may add slack and surplus variables to one or more decision variables and/or the flow conservation equations generated above to permit modeler 212 to introduce a range of values for the flow at one or more nodes 404, 504 in a linear programming (LP) problem.

For example, if demand planner 110 determines that option A be close to 60% of the total flow, the modeler may introduce a slack$_A$ and a surplus$_A$ variable to an equation representing the flow at the arc 402*b* associated with option A, and sets the equation equal to 60% of n. Among other things, this permits demand planner 110 to generate configuration take rates in a range around a predicted or desired value. According to embodiments, modeler 212 associates arc 402*b* with the equation: of $x_A + slack_A - surplus_A = 0.6n$.

Modeler 212 may continue to introduce slack and surplus variables for other decision variables associated with other options. For example, the demand planner 110 determines that option B be close to 40% of the total flow, modeler 212 may generate the following equation for a linear programming problem: $x_{B,1} + x_{B,2} + slack_B - surplus_B = 0.4n$. According to embodiments, modeler 212 may introduce slack and surplus variables representing a range for any amount or take rate for any decision variable in the pruned network model 500, according to particular needs.

According to an embodiment, modeler 212 may solve a LP optimization model according to the relationships developed for each of the arcs 402, 502 and nodes 404, 504 to determine take rates or amounts of flow and by adding all slack and surplus variables into the objective of the LP problem. At a further action, demand planner 110 solves the LP optimization model by minimizing with respect to the constraints and rules of the network model, such as flow conservation, according to the following equations:

$$\text{Minimize} \quad \text{slack}_A + \text{surplus}_A + \text{slack}_B + \text{surplus}_B + \ldots$$

$$\text{Subject to:} \quad \boxed{\begin{array}{c} x_A + \text{slack}_A - \text{surplus}_A = 0.6n \\ x_{B,1} + x_{B,2} + \text{slack}_B - \text{surplus}_B = 0.4n \\ \vdots \end{array}} \quad \text{Demand take rate constraints}$$

$$\boxed{\begin{array}{c} x_A + x_{\overline{A}} = n \\ x_{B,1} + x_{C,1} = x_A \\ \vdots \end{array}} \quad \text{Flow conservation}$$

Figure 7:
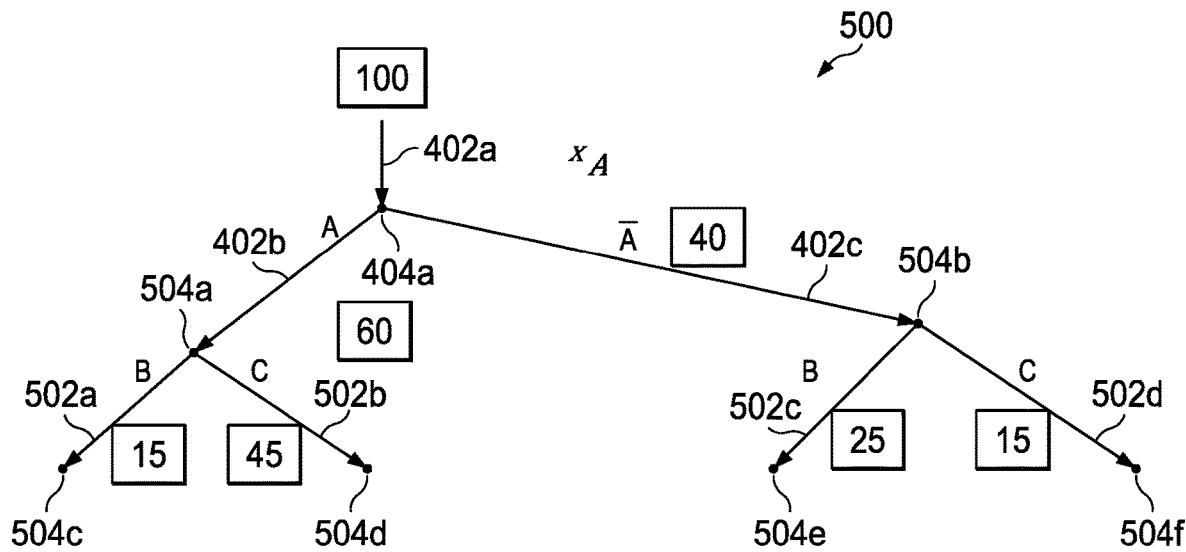
FIG. 7 illustrates the network model of FIG. 6 after reorganization according to an embodiment.

FIG. 7 illustrates an exemplary solution to the pruned network model 500, according to an embodiment. The solution illustrates that the flow is conserved along each arc 402, 502 such that the total of all final nodes (or leafs) 504c-504f, equals 100%, and the total flow leaving each node 404, 504 equals the flow arriving at each node.

For example, the flow leaving node 404a is determined by the solution to be 60 for a configuration comprising option A and 40 for a configuration not comprising option A. These values represent the flow leaving node 404a and maintain the conservation of flow because their sum equals the total flow of 100 arriving at node 404a.

According to some embodiments, demand planner 110 generates take rates or amounts associate with each valid configuration based on the solution to the pruned network model 500.

TABLE 2

| A | B | C | |
|---|---|---|---|
| 1 | 0 | 1 | 45% |
| 1 | 1 | 0 | 15% |
| 0 | 1 | 0 | 25% |
| 0 | 0 | 1 | 15% |

TABLE 2 illustrates four valid configurations based on the solution to the pruned network model 500. According to an embodiment, modeler 212 generates a take rate or an amount associated with each valid configuration. Each take rate and amount may be communicated to the demand planning engine 202, mix and feature engine 204, and/or sales and operations planning engine 206 for option planning. As stated above, a 1 in a particular column beneath an option indicates the presence of that option for the configuration represented by that row, and a 0 in a particular column beneath an option indicates the absence of that option for the configuration represented by that row. For example, a configuration representing option A and option C, but not option B may have a take rate of 45%. A configuration representing option A and option B, but not option C, may have a take rate of 15%. Other take rates for other configurations may be calculated according to particular embodiments.

After the modeler calculates the take rates or amounts, such as an option take rate, the demand planner 110 may use the network model 400 and/or the calculated take rates or amounts to generate refined values according to production rules and constraints 230, such as production capacity. For example, if the production capacity for an item necessary to produce option B is only available in quantities up to 10%, then the sum of all configurations containing option B must total less than 10%. This would mean that, in the above illustration, the network model 400 could not support 15% and 25% for the configurations that contain option B. According to embodiments, modeler 212 reduces the configuration amounts and reallocates the take rates according to this, and other, production rules and constraints 230.

According to an embodiment, option planning according to the network model 400 may comprise an action of generating take rates according to received demand, and then generating production rates based on production rules and constraints 230. This gives the demand planner 110 an overview of the optimized configuration levels, which may then be compared with configuration levels restricted by the production rules and constraints 230, such as, for example, capacity. As an example only and not by way of limitation, returning to the sunroof example of the automobile industry presented above, manufacturer 120 may be able to obtain sunroofs from an alternate supplier 150 to make up for a production constraint that reduces the take rate below an optimum level based on demand. Demand planner 110 may be able to thereby adjust the production configuration levels to be closer to the optimal configuration levels. However, for a more complex option component, such as an engine, there may not be any suitable supplier 150 and increasing capacity may entail setting up a new plant, which may take several years, the production configuration levels may inform and refine the optimal configuration levels to generate a realistic production plan.

In this manner, demand planning, mix and feature planning, and sales and operations planning inform and refine respective demand plans, option plans, and production plans based on capacity, demand, and other production rules and constraints 230. According to other embodiments, demand planning may also be directed to other fields such as retail demand planning in the clothing or grocery industry. In addition, or as an alternative, option planning may apply similarly in the retail clothing or grocery industry. For example, clothing retailers may want to predict clothing assortments for an upcoming season or for a new store. Likewise, grocery stores may want to predict the types of food or goods for an upcoming season, timeframe or new store.

Figure 8:
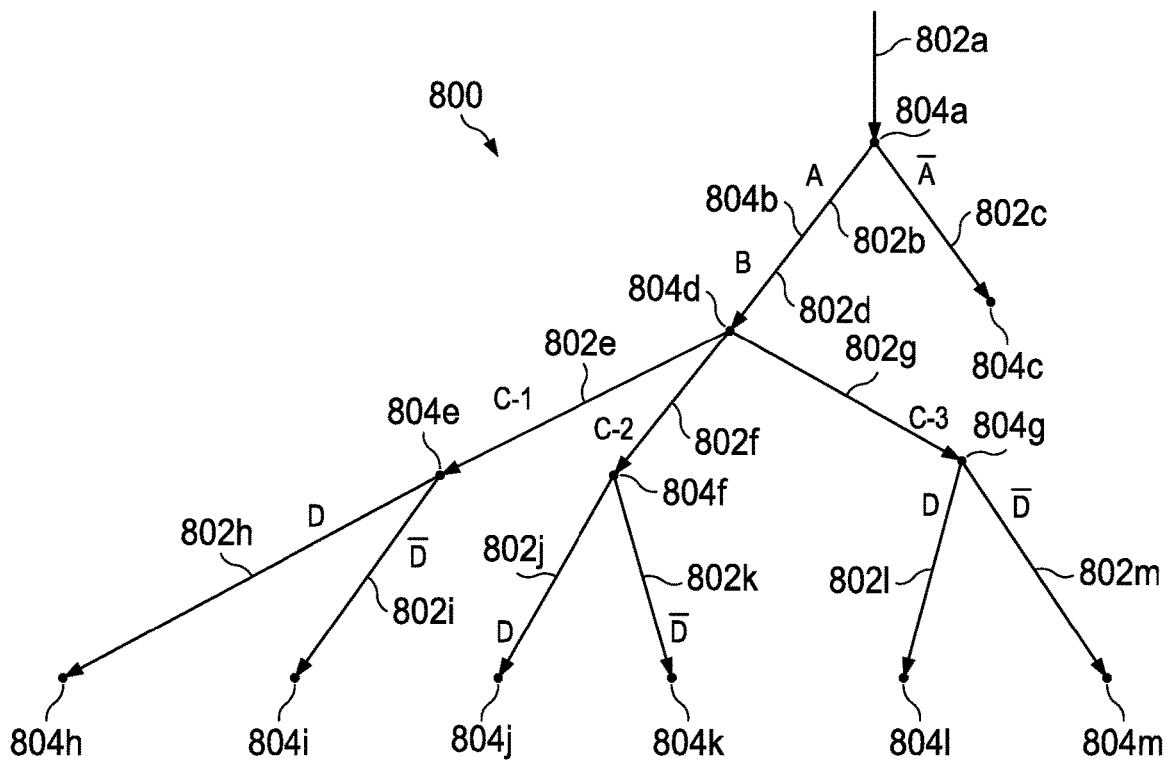
FIG. 8 illustrates an exemplary network model for an exemplary automobile and automotive component according to a further embodiment.

FIG. 8 illustrates an exemplary network model 800 for an exemplary automobile and automotive component according to a further embodiment. According to embodiments, modeler 212 generates network model 800 as a network of arcs 802 and nodes 804 representing options and option relationships. Demand planner 110 may then determine demand take rates and constraints based on the network model 800.

Network model 800 may comprise an initial arc 802a that represents the input to the model 800. Each arc 802 associated with a letter, A, B, C, and D represents the presence of an option. Each arc 802 associated with a letter with a bar above it represents not having that option. For example, arc 802b denoted A represents a configuration with option A, and arc 802c denoted $\overline{A}$ represents a configuration without option A.

According to the exemplary network model 800 illustrated in FIG. 8, the example may comprise the following option rules and constraints 234: option A is mandatory; option B must be present if option A is present; option C has three types, and each automobile must have exactly one type of option C; and option D may or may not be present.

Each arc 802 from the top of the network model 800 following along arcs 802 to the bottom of the network model 800 represents a particular configuration. For example, starting at node 804a and choosing arc 802b denoted A represents an automobile or automotive component with option A. Starting on the right side and choosing arc 802c denoted $\overline{A}$ represents an automobile or automotive component without option A.

According to embodiments, although the option rules and constraints 234 require option A to be present in the automobile configuration, embodiments contemplate including arc 802c denoted $\overline{A}$, which represents an automobile configuration without option A. This arc 802c may be included in the network model 800 in order to represent automobiles that are not produced with any of the configurations represented by the network model 800.

Next, because option B is required if option A is required, node 804b comprises only one arc 802d representing the presence of option B in all valid configurations. An arc 802 that represents the absence of option B is not included.

At the next lower node 804d, three arcs 802e-802g representing three types of option C (C-1, C-2, and C-3) connect node 804d to nodes 804e-804g, respectively. According to embodiments, some options may be represented by one or more subtypes of an option. For example, an automobile is likely to have one, and only one, radio. Option C may represent three radio types, such as a standard radio, a satellite radio, and a radio with navigation display.

At the lowest layer of the network model, arcs 802h-802m representing the presence or absence of option D connect nodes 804e-804g to leaf nodes 804h-804m. One of the arcs 802h-802m may be chosen between D and $\overline{D}$ at nodes 804e-804g. An arc 804 denoted D represents an automobile and automotive component with option D, and an arc 804 denoted $\overline{D}$ represents a configuration of an automobile and automotive component without option D.

According to an embodiment, the modeler 212 of the demand planner 110 may prune any invalid configurations from the network model 800. For example, as discussed above, an automobile is unlikely to have more than one radio. Therefore, all configurations that comprise more than one radio may be pruned from the network model 400.

After modeler 212 generates a network model 800 according to the option rules and constraints 234, modeler 212 may determine demand take rates for one or more valid configurations. Continuing with the above example, it is assumed that a total of 500 automobiles are demanded for the automobile configurations represented by network model 800. The 500 automobiles flow into the first node 804a of network model 800. Additionally, it is assumed for the following example that the desired demand take rate of option C-1 is 20%, and the desired demand take rate of option D is 50%. Modeler 212 may generate LP equations representing the demand take rate constraints (with or without slack and surplus variables). For example, the desired demand take rate of option C-1 is 20%, and the desired demand take rate of option D is 50% may be represented by the following equations: $x_{C-1}+\text{slack}_{C-1}-\text{surplus}_{C-1}=0.2n$; and $x_{D,1}+x_{D,2}+x_{D,3}+\text{slack}_D-\text{surplus}_D=0.5n$, where $x_{C-1}$ represents the flow along arc 802e, and $x_{D,1}$; $x_{D,2}$; and $x_{D,3}$ represent the flow along arcs 802h, 802j, and 802l, respectively.

Continuing with the above example, all 500 automobiles are allocated to having option A and option B because both are mandatory according to the option rules and constraints 234 associated with the illustrated exemplary network model 800, as explained above. At the next node 804d, 100 automobiles receive option C-1 based on the constraint that the demand take rate of option C-1 is 20% (20%*500=100). The remaining 400 units (500−100=400) may be, for example, allocated to option C-3. Although, the remaining 400 units are allocated to option C-3; embodiments contemplate allocated any combination of the 400 units to option C-2 or C-3, according to particular needs. At the next nodes, 804e-804g, modeler 212 determines that the sum of the demand take rates for option D is equal to 250 automobiles (50%*500=250), which represents the total of all automobiles for arcs 802h, 804j, and 802l.

Next, modeler 212 may allocate option D to the 100 automobiles that comprise option C-1. This is represented by arc 802h. Because arc 802h is the last arc 802 prior to leaf node 804h, modeler 212 determines that this particular automobile configuration is complete. Modeler 212 may determine the complete automobile configuration associated with leaf node 804h by backtracking along the arcs 802 and nodes 804 from the leaf node 804h toward to the first node 804a. Following along the arcs 802 and nodes 804 from leaf node 804h indicates the 100 automobiles associated with node 804h comprise options D, C-1, B, and A.

Next, modeler 212 may allocate the remaining 400 automobiles according to the remaining demand take rate constraints. For example, 400 automobiles have been allocated to option C-3, as explained above. Because all of the units allocated to option C-1 comprised option D, and the constraint indicates that the demand take rate for option D must be 50% of the total automobiles (which was determined to be 250 units), then modeler 212 allocates 250 units to arc 802m denoted $\overline{D}$, which indicates the absence of option D. Modeler 212 may then determine the complete configuration of these automobiles by backtracking along arcs 802 and nodes 804 from leaf node 804m to the first node 804a. Following along the arcs 802 and nodes 804 from leaf node 804m indicates the 250 automobiles associated with node 804m comprise options C-3, B, and A, and do not comprise option D.

To allocate the remaining 150 automobiles, modeler 212 may determine that of the 400 automobiles associated with option C-3, 250 automobiles have already been allocated to arc 802m denoted $\overline{D}$, which indicates the absence of option D. Therefore, modeler 212 may allocate the remaining 150 units (400−250=150) to arc 802l, which indicates the presence of option D. As explained above, modeler 212 follows along the arcs 802 and nodes 804 from leaf node 804l to determine that the 150 units associated with node 804l comprise options D, C-3, B, and A.

Because all 500 automobiles have been allocated to particular configurations, demand planner 110 may indicate the final demand take rates and configurations associated with the network model 800 and conforming to the option rules and constraints 234. For the above example, the determined demand take rates and configurations are indicated in TABLE 3.

TABLE 3

| A | B | C-1 | C-2 | C-3 | D | |
|---|---|-----|-----|-----|---|-----|
| 1 | 1 | 1 | 0 | 0 | 1 | 100 |
| 1 | 1 | 0 | 0 | 1 | 0 | 250 |
| 1 | 1 | 0 | 0 | 1 | 1 | 150 |

Although particular examples of demand take rates are shown and described; embodiments contemplate any suitable demand take rates or amounts of flow for any number or combination of arcs 802 and nodes 804, according to particular needs.

According to some embodiments, the demand planner 110 may determine production take rates by incorporating production rules and constraints 230 into network model 800.

Continuing with the above example, it is assumed that a total of 500 automobiles are demanded for the automobile configurations represented by network model 800. The 500 automobiles flow into the first node 804a of network model 800. Additionally, it is assumed for the following example that the desired production take rate of option C-1 is 20% and that capacity is constrained to produce a maximum of 100 automobiles with option D. Modeler 212 may generate LP equations representing the production take rate constraints (with or without slack and surplus variables). For example, the desired production take rate of option C-1 is 20% and may be represented by the following equation: $x_{C-1}+\text{slack}_{C-1}-\text{surplus}_{C-1}=0.2n$, where $x_{C-1}$ represents the flow along arc 802e.

Continuing with the above example, all 500 automobiles are allocated to having option A and option B because both are mandatory according to the option rules and constraints 234 associated with the illustrated exemplary network model 800, as explained above. At the next node 804d, 100 automobiles receive option C-1 based on the constraint that the production take rate of option C-1 is 20% (20%*500=100). The remaining 400 units (500−100=400) may be allocated to option C-3. As discussed above, embodiments contemplate allocated any combination of the 400 units to option C-2 or C-3, according to particular needs.

Next, modeler 212 may allocate option D to the 100 automobiles that comprise option C-1. This is represented by arc 802h. Because arc 802h is the last arc 802 prior to leaf node 804h, modeler 212 may determine this particular automobile configuration is complete. Modeler 212 may determine the complete automobile configuration associated with leaf node 804h by backtracking along the arcs 802 and nodes 804 from the leaf node 804h toward to the first node 804a. Following along the arcs 802 and nodes 804 from leaf node 804h indicates the 100 automobiles associated with node 804h comprise options D, C-1, B, and A.

Next, modeler 212 may allocate the remaining 400 automobiles according to the capacity constraint that only 100 automobiles may be produced comprising option D. For example, 400 automobiles have been allocated to option C-3, as explained above. Because all of the units allocated to option C-1 comprised option D, and the constraint indicates that the total automobiles produced comprising option D cannot be greater than 100, then modeler 212 allocates the remaining 400 units to arc 802m denoted $\overline{D}$, which indicates the absence of option D, because 100 automobiles have already been allocated that comprise option D. Modeler 212 may then determine the complete configuration of these automobiles by backtracking along arcs 802 and nodes 804 from leaf node 804m to the first node 804a. Following along the arcs 802 and nodes 804 from leaf node 804m indicates the 400 automobiles associated with node 804m comprise options C-3, B, and A, and do not comprise option D.

Because all 500 automobiles have been allocated to particular configurations, demand planner 110 may indicate the final production take rates and configurations associated with the network model 800 and conforming to the option rules and constraints 234. For the above example, the determined production take rates and configurations are indicated in TABLE 4.

TABLE 4

| A | B | C-1 | C-2 | C-3 | D | |
|---|---|-----|-----|-----|---|-----|
| 1 | 1 | 1 | 0 | 0 | 1 | 100 |
| 1 | 1 | 0 | 0 | 1 | 0 | 400 |

Although particular examples of production take rates are shown and described; embodiments contemplate any suitable production take rates or amounts of flow for any number or combination of arcs 802 and nodes 804, according to particular needs. In addition, or as an alternative, although an iterative process has been described; embodiments contemplate solving the LP problem by considering all constraints simultaneously.

According to some embodiments, demand planner 110 may generate a LP optimization problem based on the network model 800 and production rules and constraints 230 and may determine one or more rate constraints by minimizing deviation of volume and deviation of take rates in association with network conservation constraints, volume constraints, take rates constraints, and capacity constraints.

The linear function to be minimized, deviation of volume and take rates may comprise, for example, min 120 $x_{\overline{A}}+\text{slack}_C+\text{surplus}_C$, wherein the coefficient 120 in the objective function is the penalty for each automobile that are not produced.

Network conservation of flow constraints may comprise, for example, $x_A=x_B$; and $x_B=x_{C-1}+x_{C-2}+x_{C-3}$.

Volume constraints may comprise, for example, $x_A+x_{\overline{A}}=500$.

Take rates constraints may comprise, for example, $x_{C-1}+\text{slack}_{C-1}-\text{surplus}_{C-1}=0.2x_A$ Capacity constraints may comprise, for example, $x_{D-1}+x_{D-2}+x_{D-3}\leq100$.

According to some embodiments, additional production capacity constraints may be added to the LP optimization problem that represent additional configurations of automobiles represented by other network models. For example, the total automobiles produced according to the examples given in reference to FIG. 8 was 500 automobiles. According to some embodiments, the volume of automobiles for network model 800 may be added to the volume of automobiles according to a second network model, where the total volume of both models may be set less than a total number of automobiles, such as, for example, 1500 automobiles.

For example, different types of automobiles produced by an automobile manufacturer 120 may not share the same options, so they may be represented by different network models, and therefore may represent independent problems. However, the automobile manufacturer 120 may still have a limited production capacity. Therefore, even though the determined demand take rates or production take rates determined for either network model may be a particular number of automobiles, the total for both may still be constrained. For example, if the production take rate for the first network model is 500 automobiles, and the production take rate for the second network model is 1000 automobiles, the total automobiles may still be limited by the automobile manufacturer 120 capacity, which may be, for example, 1200 automobiles. Therefore, the LP optimization problem may add a production constraint that indicates a limit of the total of both automobile models.

According to some embodiments, the order of the automobiles and automotive components in the network model may represent a hierarchy based on the order that the options are selected. For example, and as discussed above, an option may have one or more dependent options. In a hierarchy, the dependent option may be lower in the network model than the option from which it depends. According to some embodiments, the order of the options is arbitrary.

According to some embodiments, variables may be represented in more than one network model at any level in the network model hierarchy, and a production constraint may comprise a limit to the number of that option in any one or more network models. Such production constraints may be added to the LP optimization problem.

According to some embodiments, the demand planner 110 solves the one or more production planning problems as one or more mixed-integer problems. For example, the demand planner 110 may use a mix planning approach with continuous variables or a forecast-order generation approach with integer variables.

A mix planning approach with continuous variables generates a percentage of the mix rate of the various options. A forecast order generation approach with integer variables generates solutions that indicate the number of automobiles to be produced.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for autonomous demand plan adjustment, comprising:
receiving an initial demand plan for two or more options that are needed to produce at least one automobile;
receiving one or more constraints, the one or more constraints are assigned to the two or more options based on hierarchy data comprising a priority associated with each of the two or more options;
modeling the two or more options as a network of arcs and nodes, wherein the nodes range from 35,000 nodes to $2.66 \times 10^6$ nodes;
generating one or more valid configurations of the two or more options that are needed to produce the at least one automobile, wherein the generating the one or more valid configurations is based at least in part upon pruning invalid configurations from the network of arcs and nodes, and wherein the generating the one or more valid configurations comprises determining which two or more options are able to be present in combination with other two or more options of the at least one automobile;
autonomously adjusting the demand plan for the one or more valid configurations of the two or more options based on production constraints and determining production take rates based on the one or more constraints assigned to the two or more options;
iteratively repeat the modelling, generating, and adjusting to generate an adjusted demand plan limited by the production constraints and the one or more valid configurations that would meet a market demand;
autonomously communicating the adjusted demand plan to at least one manufacturer for the at least one manufacturer to manufacture, using automated robotic production machinery, the at least one automobile and automotive components based on the adjusted demand plan for the one or more valid configurations and the production take rates;
manufacture, using the automated robotic production machinery, the at least one automobile and the automotive components based on the adjusted demand plan for the one or more valid configurations and the production take rates; and
autonomously communicating the adjusted demand plan to at least one supplier for the at least one supplier to transport, using automated distribution systems, the at least one automobile based on the adjusted demand plan for the one or more valid configurations and the production take rates.

2. The method of claim 1, wherein the production take rates are first production take rates and further comprising:
receiving one or more rules;
determining second production take rates based-on the one or more rules and the one or more constraints; and
causing the at least one manufacturer to manufacture, the at least one automobile based on the determined first and second production take rates.

3. The method of claim 2, wherein the one or more rules and the one or more constraints are assigned to the two or more options based on the hierarchy data.

4. The method of claim 3, wherein the hierarchy data comprises a priority associated with each of the two or more options.

5. The method of claim 2, wherein the one or more rules and the one or more constraints comprise one or more of:
network conservation constraints;
volume constraints;
take rate constraints; and
production constraints.

6. The method of claim 5, wherein the production constraints comprise capacity.

7. The method of claim 4, further comprising:
permitting a user to directly edit one or more of demand mix rate and production mix rate.

8. A non-transitory computer-readable medium comprising software for autonomous demand plan adjustment, the software when executed configured to:
receive an initial demand plan for two or more options that are needed to produce at least one automobile;
receive one or more constraints, the one or more constraints are assigned to the two or more options based on hierarchy data comprising a priority associated with each of the two or more options;
model the two or more options as a network of arcs and nodes, wherein the nodes range from 35,000 nodes to $2.66 \times 10^6$ nodes;
generate one or more valid configurations of the two or more options that are needed to produce the at least one automobile, wherein the generate the one or more valid configurations is based at least in part upon pruning invalid configurations from the network of arcs and nodes, and wherein the generate the one or more valid configurations comprises determining which two or more options are able to be present in combination with other two or more options of the at least one automobile;

autonomously adjust the demand plan for the one or more valid configurations of the two or more options based on production constraints and determine production take rates based on the one or more constraints assigned to the two or more options;

iteratively repeat the model, generate and adjust to generate an adjusted demand plan limited by the production constraints and the one or more valid configurations that would meet a market demand;

autonomously communicate the adjusted demand plan to at least one manufacturer for the at least one manufacturer to manufacture, using automated robotic production machinery, the at least one automobile and automotive components based on the adjusted demand plan for the one or more valid configurations and the production take rates;

manufacture, using the automated robotic production machinery, the at least one automobile and the automotive components based on the adjusted demand plan for the one or more valid configurations and the production take rates; and autonomously communicate the adjusted demand plan to at least one supplier for the at least one supplier to transport, using automated distribution systems, the at least one automobile based on the adjusted demand plan for the one or more valid configurations and the production take rates.

9. The non-transitory computer-readable medium of claim 8, wherein the production take rates are first production take rates and the software is further configured to:
  receive one or more rules;
  determine second production take rates based-on the one or more rules and the one or more constraints; and
  cause the at least one manufacturer to manufacture, the at least one automobile based on the determined first and second production take rates.

10. The non-transitory computer-readable medium of claim 9, wherein the one or more rules and the one or more constraints are assigned to the two or more options based on the hierarchy data.

11. The non-transitory computer-readable medium of claim 10, wherein the hierarchy data comprises a priority associated with each of the two or more options.

12. The non-transitory computer-readable medium of claim 9, wherein the one or more rules and the one or more constraints comprise one or more of:
  network conservation constraints;
  volume constraints;
  take rate constraints; and
  production constraints.

13. The non-transitory computer-readable medium of claim 12, wherein the production constraints comprise capacity.

14. The non-transitory computer-readable medium of claim 11, wherein the software is further configured to:
  permit a user to directly edit one or more of demand mix rate and production mix rate.

15. A system for autonomous demand plan adjustment, comprising:
  a computer comprising a processor and a memory, the computer configured to:
    receive an initial demand plan for two or more options that are needed to produce at least one automobile;
    receive one or more constraints, the one or more constraints are assigned to the two or more options based on hierarchy data comprising a priority associated with each of the two or more options;
    model the two or more options as a network of arcs and nodes, wherein the nodes range from 35,000 nodes to $2.66 \times 10^6$ nodes;
    generate one or more valid configurations of the two or more options that are needed to produce the at least one automobile, wherein the generate the one or more valid configurations is based at least in part upon pruning invalid configurations from the network of arcs and nodes, and wherein the generate the one or more valid configurations comprises determining which two or more options are able to be present in combination with other two or more options of the at least one automobile;
    autonomously adjust the demand plan for the one or more valid configurations of the two or more options based on production constraints and determining production take rates based on the one or more constraints assigned to the two or more options;
    iteratively repeat the model, generate and adjusting to generate an adjusted demand plan limited by the production constraints and the one or more valid configurations that would meet a market demand;
    autonomously communicate the adjusted demand plan to at least one manufacturer for the at least one manufacturer to manufacture, using automated robotic production machinery, the at least one automobile and automotive components based on the adjusted demand plan for the one or more valid configurations and the production take rates;
    manufacture, using the automated robotic production machinery, the at least one automobile and the automotive components based on the adjusted demand plan for the one or more valid configurations and the production take rates; and
    autonomously communicate the adjusted demand plan to at least one supplier for the at least one supplier to transport, using automated distribution systems, the at least one automobile based on the adjusted demand plan for the one or more valid configurations and the production take rates.

16. The system of claim 15, wherein the production take rates are first production take rates and the computer is further configured to:
  receive one or more rules;
  determine second production take rates based on the one or more rules and the one or more constraints; and
  cause the at least one manufacturer to manufacture, the at least one automobile based on the determined first and second production take rates.

17. The system of claim 16, wherein the one or more rules and the one or more constraints are assigned to the two or more options based on the hierarchy data.

18. The system of claim 17, wherein the hierarchy data comprises a priority associated with each of the two or more options.

19. The system of claim 16, wherein the one or more rules and the one or more constraints comprise one or more of:
   network conservation constraints;
   volume constraints;
   take rate constraints; and
   production constraints.

20. The system of claim 18, wherein the computer is further configured to:
   permit a user to directly edit one or more of demand mix rate and production mix rate.

* * * * *